United States Patent [19]
Bockowski et al.

[11] 3,895,913
[45] July 22, 1975

[54] PHOTOMETRIC TEST METHOD FOR CHELANT RESIDUAL OR DEFICIENCY

[75] Inventors: Edmund J. Bockowski, Hatboro, Pa.; Louis J. Stefanelli, Pennsauken, N.J.

[73] Assignee: Betz Laboratories, Inc., Trevose, Pa.

[22] Filed: Sept. 6, 1974

[21] Appl. No.: 503,895

[52] U.S. Cl. ............................................. 23/230 R
[51] Int. Cl.² .................. G01N 31/22; G01N 33/18
[58] Field of Search ...................... 23/230 R, 253 TP

[56] References Cited
UNITED STATES PATENTS

| | | | |
|---|---|---|---|
| 3,240,717 | 3/1966 | Johnson | 23/230 R X |
| 3,368,969 | 2/1968 | Palen | 23/230 R X |
| 3,386,806 | 6/1968 | Kross | 23/230 R |
| 3,496,113 | 2/1970 | Platte et al. | 23/230 R X |
| 3,697,224 | 10/1972 | Means | 23/230 R |

OTHER PUBLICATIONS

Linstrom et al., "Indicator for the Titration of Calcium Plus Magnesium with EDTA" Anal. Chem. Vol. 32, 1960 pp. 1123–1127.

*Primary Examiner*—Morris O. Wolk
*Assistant Examiner*—Arnold Turk
*Attorney, Agent, or Firm*—Alexander D. Ricci

[57] ABSTRACT

Chelant residual or deficiency in water containing divalent calcium and magnesium hardness ions with or without heavy metal ions is determined photometrically by adding to the water a solution comprising the salt of a hardness ion and a second chelating agent, said agent having a higher affinity for heavy metals than the chelant to be measured, and then adding a solution of Calmagite dye, and then reading the change in absorbance of the dye solution with the photometer.

3 Claims, No Drawings

PHOTOMETRIC TEST METHOD FOR CHELANT RESIDUAL OR DEFICIENCY

BACKGROUND OF THE INVENTION

As is well known, chelating agents are added to industrial water, particularly boiler water, for the purpose of sequestering scale-forming metal ions, commonly called the hardness ions of calcium and magnesium. The chelant holds or sequesters such ions and prevents the metals from depositing as a scale on the surfaces of the water system.

It is, therefore, obviously desirable to be able to determine with a relative amount of ease and convenience the level of free chelant, or conversely the amount of chelant lacking, in an industrial water system at any given time. The prior art discloses numerous methods for determining the level of excess chelating agent, on the theory that optimum effectiveness in the prevention of scale occurs when there is a small but specific excess of the chelant present. However, if a user desires to prevent scale formation while at the same time keeping the level of chelant as close to the stoichiometric amount required to balance the amount of hardness ion present, it would be desirable to have a method which also measures slight deficiencies in the level of chelant required.

Regardless of the result desired, the standard prior art technique for determining either chelant residual (excess) or deficiency, is by titration, wherein the unknown amount is determined by adding a reagent, with which the unknown amount will react in predetermined proportions. If one knows the amount of reagent required to reach the so-called "end point", the unknown quantity is then determined by routine calculation. In the prior art, the end point is normally a visually detectable change, such as a change in the color of an indicator dye.

Numerous problems have been experienced in using titration procedures when determining chelant levels in industrial waters. Most titration methods, for example, are ill-adapted for use in the field, where the test is most required. The time required for these procedures is considerable and the amount of calculation involved leads to the possibility of arithmetic error. Additionally most indicator dyes previously used are subject to a drifting end point (color change) caused by interference with the dye from reaction with heavy metal ions, such as iron, which are also present in the sample. Also most prior art methods are not adapted to determine both residual and deficiency of the chalent. Attempts have been made to mask the effect of the heavy metal interference with the color indicator by employing reagents which compete successfully for the heavy metals as compared to the dye. All of the prior art masking agents have been seen to have less than total effect in the masking process, particularly when the chelant used is a strong one, such as EDTA (ethylenedinitrilotetraacetic acid).

SUMMARY OF THE INVENTION

It is thus an object of the present invention to provide a method for determining chelant level in industrial water which does not involve titration. It is a further object to provide such a method which yields either chelant residual or deficiency. It is a further object to provide a method which eliminates drifting end points caused by heavy metal-dye reaction. It is a further object to accomplish these aims using a method which is easily employed in the field and which requires a minimum amount of time on the part of the analyst.

It has been discovered that the above objects are attained by using the following method which employs absorbance readings determined photometrically; a water sample is obtained; a solution comprising the salt of a hardness metal, calcium or magnesium, and a second chelating agent where the agent has a higher affinity for iron and other heavy metals than does the first chelant; then a solution of the color indicator, Calmagite, is added to the mixture; the color change, which is characteristic of the residual or deficiency of the first chelant, is generated in the sample; the absorbance value is read photometrically and compared to a predetermined set of absorbance values plotted against ppm levels of chelant excesses or deficiencies. This method, with the reagents carefully prepared in advance, can be employed in the field and used in a matter of minutes to determine chelant level in an industrial water sample.

DETAILED DESCRIPTION OF THE INVENTION

The method of this invention will be described in terms of, but is not limited to, measuring the residual or deficiency in boiler water of the chelant EDTA. We have discovered that, if a second chelant known as CDTA (cyclohexylenedinitrilotetraacetic acid) is used as the masking agent, then heavy metals interference with the Calmagite indicator is essentially eliminated. It has further been discovered that if equimolar portions of the salt of a hardness ion and CDTA are introduced in the water sample prior to the dye, association of a heavy metal ion with the masking agent will effectively dissociate a hardness ion to the primary chelant EDTA. Thus not only is heavy metal interference with the dye eliminated, but a much more accurate picture of metal ion content is obtained. Normally only the hardness metal content of calcium and magnesium is determinable. However, since heavy metal ions also contribute hardness to the water in addition to a threat of interference with the indicator, it is an additional advantage to be able to both mask out the interference effect while at the same time include the heavy metal content as a hardness factor. CDTA was selected as the masking agent because its stability constant for iron is greater by a factor of 10,000 as compared to the stability constant for iron of EDTA.

As mentioned before, the color indicator is a commercially available dye known as Calmagite, one source of which is Eastman Organic Chemicals, Inc.; chemically the dye is identified as 1-(hydroxy-4-methyl-2-phenylazo)-2 naphthol-4-sulfonic acid, molecular weight of 358.38. In its normal unreacted state, Calmagite possesses a dark bluish color. The dye readily complexes with metal ions, the greater the amount of complexing, the more reddish it becomes. Thus it was decided that, if a reagent were prepared, it would precede the dye into the sample solution to be analyzed, where the reagent would provide both hardness ions to complex with the dye and the masking agent to eliminate heavy metal interference, an absorbance value could be obtained with a photometer characteristic of the color generated when the dye, joined with the reagent, could vary to the blue side or the red side depending upon the presence in the sample of excess chelant or excess hardness. This middle absorbance value is entirely arbitrary and depends solely upon the levels of chelant residual or deficiency which are to be measured. For example, if it is desired to be able to measure a chelant excess or deficiency of up to 10 ppm, as EDTA a reference absorbance value would be sought which would be different from the value required if levels of up to say 20 ppm had to be measured. Range of calibration is easily changed to more or less sensitivity by varying sample volume to be tested.

In summary, the method provides that, where hardness dominates chelant level (chelant deficiency) the excess hardness ions will react with the dye driving the color to the reddish side of the spectrum; and conversely, where there is chelant residual, the excess chelant will pull hardness ions away from the dye, thus driving the color to the bluish end of the spectrum. It has been discovered that heavy metal ions present in the sample will be sequestered by the masking agent CDTA, thus releasing an equal amount of hardness ions previously complexed by the CDTA, thus giving a more accurate picture of total hardnes present. Also, the masking agent is essentially effective in preventing attack of the color indicator by the heavy metal ions. It is also essential that the pH of the sample be estabilized between 10 and 11 for maximum effectiveness of the instant method. Any method for accomplishing this which does not interfere with the sensitivity of the dye or the chelant-metal balance in the sample is acceptable. Preferably monoethanolamine is used as the pH control. Examples which follow below describe in a more specific way the standardization of the reagent and dye solutions, and the actual practice of the method of this invention in the field. These aspects of the invention are described assuming the use of a Leitz Model "M" photometer having a 640 filter and a 20 millimeter optical path.

EXAMPLE 1 (Standardization of Dye Solution)

250 ml of double-distilled water is placed in a chemically clean plastic beaker and the pH is adjusted to between 10 and 11 using an appropriate quantity of monoethanolamine. 10 ml of the dye solution (prepared by dissolving 0.29 grams of Calmagite in one liter of double-distilled water) is placed in the beaker and mixed. Using the above photometer with a 640 filter and the above path length, the reading is adjusted to zero absorbance using double-distilled water as a reference. For purposes of the examples herein, the solution is considered standardized when an absorbance of 0.465 is attained and relative to double-distilled water zero absorbance.

EXAMPLE 2 (Standardization of Chelant Reagent Solution)

The reagent is prepared by mixing equal volumes of 0.01 molar solutions of CDTA and $MgSO_4 \cdot 7H_2O$ (magnesium sulfate heptahydrate). The CDTA is available from several suppliers such as Aldrich Chemical Company, Catalog No. 12, 581.4. (The CDTA molar solution is prepared by dissolving 3.5 grams of CDTA in a liter of distilled water containing 20 mls of monoethanolamine for pH control). 10 ml of the equimolar reagent solution thus prepared is added to 200 ml of double-distilled water in a plastic beaker. 10 ml of dye solution standardized as in Example 1 is then added to the beaker and mixed. This creates the pre-complexing of the dye by the certain amount of the magnesium hardness ions present in the reagent. The absorbance is measured using the photometer. The solution is considered to be standardized when an absorbance of 0.350 is obtained. The absorbance is adjusted by adding 0.01 molar CDTA to increase the value and using 0.01 molar $MgSO_4 \cdot 7H_2O$ to decrease the value. For safety, the absorbance should be checked again after 24 hours, but this is not usually necessary.

EXAMPLE 3

Using the quantities employed for preparing the standardized dye and reagent solutions as in the first two examples, the following chart, plotting absorbances agains ppm levels of EDTA chelant (38% solution) was prepared; prior art methods for determining chelant residual and deficiency were used to check the accuracy of the chart, and the chart was found to be correct.

LEITZ MODEL "M" 640F

EDTA Chelant Solution (38% EDTA Content)

| Absorbance X 1000 | Deficient ppm EDTA Chelant Solution | Absorbance X 1000 | Residual ppm EDTA Chelant Solution |
|---|---|---|---|
| 195 | −50 | 360 | +2 |
| 200 | −48 | 365 | +4 |
| 205 | −46 | 370 | +6 |
| 210 | −44 | 380 | +8 |
| 215 | −42 | 385 | +10 |
| 220 | −40 | 390 | +12 |
| 230 | −38 | 400 | +14 |
| 235 | −36 | 405 | +16 |
| 240 | −34 | 415 | +18 |
| 245 | −32 | 420 | +20 |
| 250 | −30 | 425 | +22 |
| 260 | −28 | 435 | +24 |
| 265 | −26 | 440 | +26 |
| 270 | −24 | 445 | +28 |
| 275 | −22 | 455 | +30 |
| 280 | −20 | 460 | +32 |
| 290 | −18 | 465 | +34 |
| 295 | −16 | 470 | +36 |
| 300 | −14 | 475 | +38 |
| 310 | −12 | 485 | +40 |
| 315 | −10 | | |
| 320 | − 8 | | |
| 330 | − 6 | | |
| 335 | − 4 | | |
| 340 | − 2 | | |
| 350 | 0.0 | | |

EXAMPLE 4

An example of the preferred method of determining chelant level in the field using the method of this invention follows:

25 ml boiler water sample is placed into a chemically clean plastic beaker. 175 ml of double-distilled water is added to the boiler sample. 10 ml of the standardized chelant reagent solution of Example 2 is placed in the beaker and stirred. A portion of the solution is transferred to the Leitz photometer and the photometer is set at zero absorbance. The portion is then returned to the plastic beaker. 10 ml of the standardized dye solution of Example 1 is placed in the beaker and mixed. Chelant residual or deficiency is determined by measuring the absorbance on the photometer of the resulting solution.

It should be stressed that the precise numbers used above in all of the examples are considerably arbitrary and depend to a large extent upon factors in the control of the laboratory analyst. It will be seen that the essence of the method of this invention resides in the use of a color indicator which complexed readily with hardness ions and which also dissociates itself therefrom under chelating conditions, the use of a second chelating agent which has a high enough stability constant for heavy metals to prevent attack by the latter on the color indicator, and the overall use of a method which automatically yields either chelant residual or deficiency. It will be obvious to one skilled in the art, given the essence of the invention, to vary the parameters herein to cover other situations involving other chelants to be measured, without departing from the scope of the invention.

We claim:

1. A method of determining the amount of a first metal chelating agent relative to the level of magnesium, calcium and heavy metal ions in water, which comprises,
   a. adding to a sample of said water a solution comprised of equimolar portions of a magnesium or calcium salt and a second chelating agent, said second chelating agent having a higher stability constant for heavy metal ions than the said first chelating agent; wherein the second chelating agent substitutes magnesium or calcium ions for the heavy metal ions in the water; and then,
   b. adding to the sample a color indicator pre-complexed with magnesium or calcium ions, said pre-complexed color indicator being capable of reacting with calcium or magnesium ions in the water when said first chelating agent is present in an amount stoichiometrically less than that required to bind up all calcium and magnesium ions present, simultaneously generating a characteristic color, and said pre-complexed color indicator capable of yielding calcium and magnesium ions where said first chelating agent is present in an amount equal to or greater than the stoichiometric amount required to bind up all calcium and magnesium ions present, thus generating another characteristic color; then,
   c. measuring the absorbance of the generated color photometrically to determine the relative amount of said first metal chelating agent which is present.

2. The method of claim 1 where said first chelating agent is ethylenedinitrilotetraacetic acid and said second chelating agent is cyclohexylenedinitrilotetraacetic acid.

3. The method of claim 2 where said color indicator is Calmagite.

* * * * *